US012736014B2

(12) United States Patent
Shimada et al.

(10) Patent No.: US 12,736,014 B2
(45) Date of Patent: Sep. 15, 2026

(54) HYDROGEN MIXED-COMBUSTION ELECTRONIC CONTROL DEVICE AND POWER GENERATION SYSTEM USING SAME

(71) Applicant: Hitachi, Ltd., Tokyo (JP)

(72) Inventors: Atsushi Shimada, Tokyo (JP); Yoshihiro Sukegawa, Tokyo (JP); Kengo Kumano, Tokyo (JP)

(73) Assignee: HITACHI, LTD., Tokyo (JP)

( * ) Notice: Subject to any disclaimer, the term of this patent is extended or adjusted under 35 U.S.C. 154(b) by 313 days.

(21) Appl. No.: 18/708,644

(22) PCT Filed: Sep. 26, 2022

(86) PCT No.: PCT/JP2022/035605
§ 371 (c)(1),
(2) Date: May 9, 2024

(87) PCT Pub. No.: WO2023/105890
PCT Pub. Date: Jun. 15, 2023

(65) Prior Publication Data
US 2026/0160211 A1 Jun. 11, 2026

(30) Foreign Application Priority Data
Dec. 6, 2021 (JP) ................................ 2021-198029

(51) Int. Cl.
*F02D 41/00* (2006.01)
*F02D 19/06* (2006.01)
(Continued)

(52) U.S. Cl.
CPC ..... *F02D 41/0027* (2013.01); *F02D 19/0644* (2013.01); *F02D 41/22* (2013.01);
(Continued)

(58) Field of Classification Search
CPC . F02D 41/0027; F02D 41/22; F02M 21/0206; F02M 25/10; F02M 2700/4321
See application file for complete search history.

(56) References Cited

U.S. PATENT DOCUMENTS 5,278,760 A * 1/1994 Ribbens ................ F02D 41/22 701/99
9,318,761 B2 4/2016 Kobayashi
(Continued)

FOREIGN PATENT DOCUMENTS

JP 06-207551 A 7/1994
JP 8-135482 A 5/1996
(Continued)

OTHER PUBLICATIONS

International Search Report of PCT/JP2022/035605 dated Dec. 6, 2022.
(Continued)

*Primary Examiner* — Jacob M Amick
(74) *Attorney, Agent, or Firm* — MATTINGLY & MALUR, PC

(57) ABSTRACT

A hydrogen mixed-combustion electronic control device that controls the mixed ratio of hydrogen mixedly combusted in a combustion room of a hydrogen mixed-combustion engine having a first fuel supply device that supplies first fuel to the engine and a second fuel supply device that supplies fuel partially containing hydrogen to the engine as second fuel comprises: a crank angle sensor that detects a rotation time of a crank shaft of the engine; and a computation unit that computes an extreme value of the rotation time of the crank shaft and an extreme value timing on the basis of a detection result of the crank angle sensor. The
(Continued)

electronic control device determines a combustion state of the engine on the basis of the extreme value and the extreme value timing.

13 Claims, 12 Drawing Sheets

(51) Int. Cl.
*F02D 41/22* (2006.01)
*F02M 21/02* (2006.01)
*F02M 25/10* (2006.01)

(52) U.S. Cl.
CPC ........ *F02M 21/0206* (2013.01); *F02M 25/10* (2013.01); *F02M 2700/4321* (2013.01)

(56) References Cited

U.S. PATENT DOCUMENTS

| | | | | |
|---|---|---|---|---|
| 2005/0241376 | A1 | 11/2005 | Miyata et al. | |
| 2009/0043479 | A1* | 2/2009 | Noda | F02D 19/0671 123/304 |
| 2011/0017176 | A1 | 1/2011 | Mizuno et al. | |
| 2013/0273445 | A1 | 10/2013 | Kobayashi | |
| 2019/0162158 | A1* | 5/2019 | Zurlo | F02D 41/0062 |
| 2022/0220908 | A1 | 7/2022 | Sukegawa et al. | |

FOREIGN PATENT DOCUMENTS

| | | | |
|---|---|---|---|
| JP | 2003-120350 | A | 4/2003 |
| JP | 2005-9354 | A | 1/2005 |
| JP | 2005-299511 | A | 10/2005 |
| JP | 2008-121641 | A | 5/2008 |
| JP | 2009-270523 | A | 11/2009 |
| JP | 2011-26961 | A | 2/2011 |
| JP | 2013-108485 | A | 6/2013 |
| JP | 2016-130473 | A | 7/2016 |
| JP | 2019-027402 | A | 2/2019 |
| JP | 2020-190234 | A | 11/2020 |
| WO | 2013/035312 | A1 | 3/2013 |

OTHER PUBLICATIONS

Written Opinion of the International Search Authority of PCT/JP2022/035605 dated Dec. 6, 2022.
Japanese Office Action received in corresponding Japanese Application No. 2021-198029 dated Dec. 24, 2024.

* cited by examiner

FIG. 6
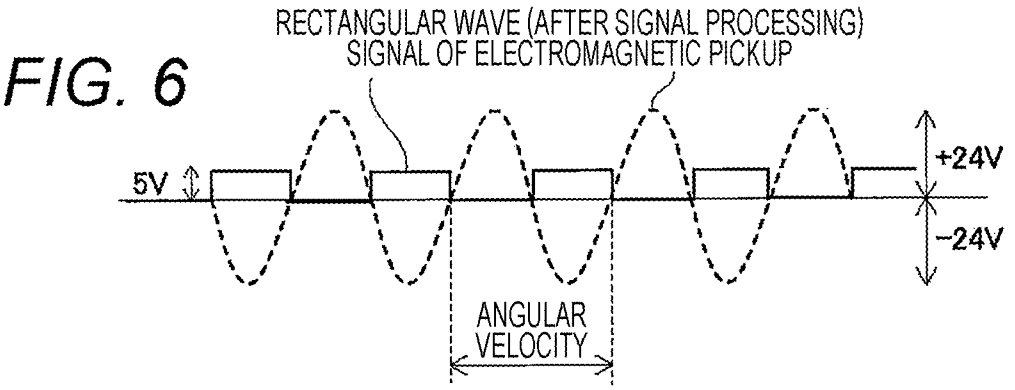
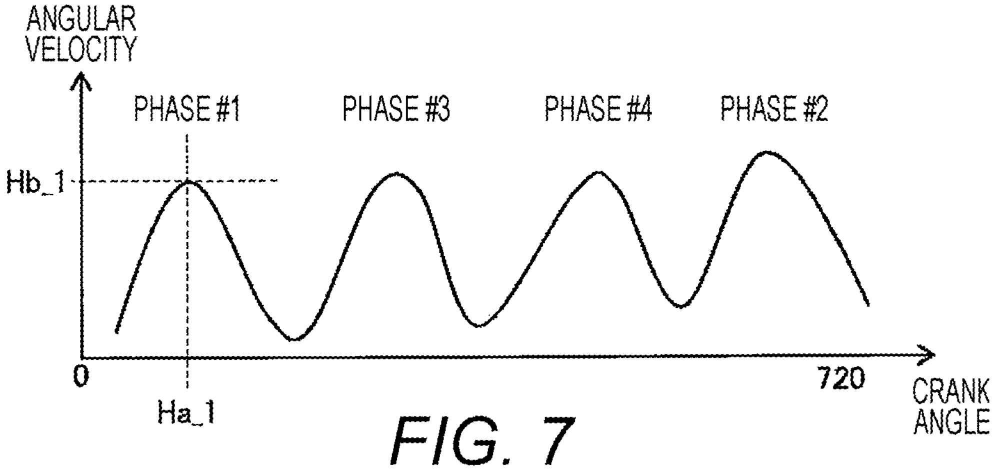
FIG. 7

| | $C_V < L_{CV}$ | $C_V > L_{CV}$ |
|---|---|---|
| $A_{Hb} > L_{Hb}$ | (ABNORMALITY A) HIGH FREQUENCY OF OCCURRENCE OF ABNORMAL COMBUSTION SUCH AS PRE-IGNITION AND KNOCKING | (ABNORMALITY B) OCCURRENCE OF ABNORMAL COMBUSTION SUCH AS PRE-IGNITION AND KNOCKING |
| $A_{Hb} < L_{Hb}$ | NORMAL COMBUSTION | (ABNORMALITY C) OCCURRENCE OF KNOCKING OR MISFIRE |

| | Cyl= 1 | Cyl= 2 | Cyl= 3 | Cyl= 4 |
|---|---|---|---|---|
| $R^2$ | 0.9604 | 0.9972 | 0.9974 | 0.9768 |

OCCURRENCE OF SURPLUS POWER GENERATION

NO OCCURRENCE OF SURPLUS POWER GENERATION

HYDROGEN MIXED-COMBUSTION ELECTRONIC CONTROL DEVICE AND POWER GENERATION SYSTEM USING SAME

TECHNICAL FIELD

The present invention relates to a hydrogen mixed-combustion electronic control device and a power generation system using the same.

BACKGROUND ART

As a decarbonization system for reducing the use of fossil fuels, a hydrogen mixed-combustion engine system utilizing hydrogen generated by renewable energy has been studied for power generation, cogeneration, and the like. Since the combustion speed of hydrogen is about 7 times or more that of a known hydrocarbon fuel, adjusting the supply of hydrogen makes it possible to improve thermal efficiency.

Meanwhile, when the combustion timing greatly changes depending on the amount of hydrogen supplied, abnormal combustion such as backfire, after-fire, pre-ignition, or knocking occurs, and thus the engine may fail in some cases. Further, when the combustible range of hydrogen is deviated, unburned hydrogen that is not burned out is discharged to the outside of the engine, which leads to a decrease in thermal efficiency. In this case, discharge of hydrogen to the outside of the engine causes concern about safety in the periphery.

As described above, in an engine that uses hydrogen as a partial fuel, it is necessary to detect a combustion state in real time in order to suppress abnormal combustion and misfire. A technique for detecting a combustion state is disclosed in PTL 1 and PTL 2.

PTL 1 recites that, in an engine using hydrogen as a partial fuel, "a control device of an internal combustion engine detects the presence or absence of occurrence of pre-ignition/back-fire in each cylinder based on an in-cylinder pressure and a crank angle of each cylinder, performs control for increasing a combustion speed for each cylinder in which the occurrence of the pre-ignition is detected, and performs control for decreasing an in-cylinder temperature for each cylinder in which the occurrence of the backfire is detected".

PTL 2 recites a method of estimating a combustion timing by detecting an extreme value timing of the present crank rotation speed without using an in-cylinder pressure sensor. PTL 2 recites, for example, that "included are a rotation speed calculation unit that calculates a crank rotation speed of an internal combustion engine, an extreme value timing calculation unit that calculates an extreme value timing of the crank rotation speed calculated by the rotation speed calculation unit, and a combustion state estimation unit that estimates a combustion state based on the extreme value timing of the crank speed calculated by the extreme value timing calculation unit".

CITATION LIST

Patent Literature

PTL 1: JP 2016-130473 A
PTL 2: JP 2020-190234 A

SUMMARY OF INVENTION

Technical Problem

In the method described in PTL 1, an in-cylinder pressure sensor is required for each cylinder, and additional cost is required. Further, it is necessary to secure and process a space for connecting the in-cylinder pressure sensor to a combustion room.

In the method described in PTL 2, it is possible to detect an MFB 50 timing (combustion gravity center timing), but it is difficult to detect abnormal combustion such as knocking or pre-ignition in real time. Furthermore, since all the cylinders are connected to a crank shaft, there is a problem that it is difficult to determine the MFB 50 timing for each cylinder.

The present invention has been made in view of such a situation, and an object of the present invention is to provide a hydrogen mixed-combustion electronic control device capable of determining a combustion abnormality of a hydrogen mixed-combustion engine in real time for each cylinder without adding an in-cylinder pressure sensor or the like, and a power generation system using the hydrogen mixed-combustion electronic control device.

Solution to Problem

A hydrogen mixed-combustion electronic control device according to the present invention controls a mixed ratio of hydrogen mixedly combusted in a combustion room of a hydrogen mixed-combustion engine, the hydrogen mixed-combustion engine including a first fuel supply device configured to supply a first fuel to an engine, and a second fuel supply device configured to supply, as a second fuel, fuel partially containing hydrogen to the engine, the hydrogen mixed-combustion electronic control device including:

a crank angle sensor that detects a rotation time of a crank shaft of the engine; and a computation unit that computes an extreme value of the rotation time of the crank shaft and an extreme value timing based on a detection result of the crank angle sensor, in which the hydrogen mixed-combustion electronic control device determines a combustion state of the engine based on the extreme value and the extreme value timing.

Advantageous Effects of Invention

According to the present invention, it is possible to provide a hydrogen mixed-combustion electronic control device capable of determining a combustion abnormality of a hydrogen mixed-combustion engine in real time for each cylinder without adding an in-cylinder pressure sensor or the like, and a power generation system using the hydrogen mixed-combustion electronic control device.

Problems, configurations, and effects other than those described above will be clarified by the description of embodiments below.

BRIEF DESCRIPTION OF DRAWINGS

FIG. 6 is a diagram illustrating an example of a signal of an electromagnetic pickup in a system using the electromagnetic pickup.

FIG. 7 is a diagram illustrating an example of a rotation time profile in the case of a four-cylinder engine.

DESCRIPTION OF EMBODIMENTS

Hereinafter, embodiments of the present invention will be described with reference to the attached drawings. In the present specification and the drawings, components having substantially the same function or configuration are denoted by the same reference signs, and redundant description is omitted.

Figure 1:
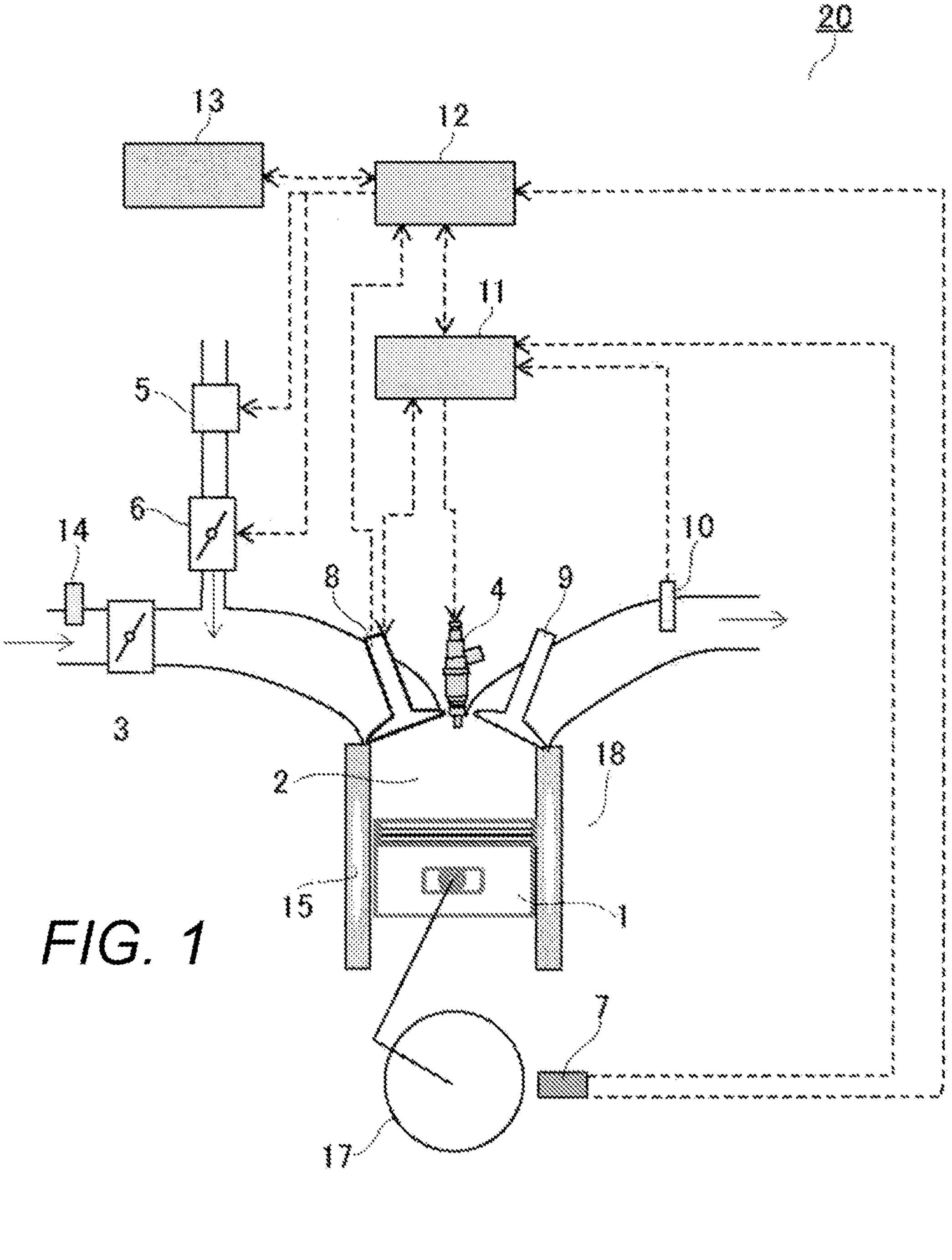
FIG. 1 is a schematic view of an engine system using hydrogen as a partial fuel.

FIG. 1 is a schematic view of an engine system 20 using hydrogen as a partial fuel. The engine system 20 includes an engine 18 that uses hydrogen as a partial fuel.

In the engine system 20, an injector 4 (an example of a fuel injection device) directly injects the first fuel, for example, hydrocarbon fuel into a combustion room 2. A piston 1 compresses the first fuel supplied to the combustion room 2 to have a high temperature and a high pressure. In this state, the first fuel self-ignites and combusts to generate torque in the piston 1. The vertical movement of the piston 1 is converted into the rotational movement of a crank shaft 17. A generator (not illustrated) is connected to the crank shaft 17, and the generator generates power as the crank shaft 17 rotates.

An intake pipe of the engine 18 is provided with a throttle valve 3. An engine control controller 11 adjusts the opening degree of the throttle valve 3, and thus the amount of air taken in from the intake pipe to the combustion room 2 changes. An opening degree sensor (not illustrated) detects the opening degree of the throttle valve 3 and outputs the opening degree to the engine control controller 11.

A flow rate adjustment device 6 supplies gas fuel as the second fuel to the intake pipe of the engine, and the gas fuel is supplied to the combustion room 2 in a state of being mixed with air. The pre-mixed gas of the second fuel and air is heated and combusted by self-ignition combustion of the first fuel in the combustion room 2. Such combustion of the first fuel and the second fuel is referred to as "dual combustion" and will be described below.

The second fuel is a gas partially containing hydrogen, and is, for example, a hydrogen-rich gas, a natural gas partially containing hydrogen, a biogas partially containing hydrogen, a synthetic gas partially containing hydrogen, ammonia, or a reformed gas. The reformed gas is, for example, a gas obtained by reforming a biofuel such as natural gas, biogas, or ethanol, ammonia, or a synthetic fuel. A hydrogen generation device 5 and the flow rate adjustment device 6 are used as an example of the second fuel supply device that supplies, as the second fuel, fuel partially containing hydrogen to the engine (engine 18).

As the hydrogen generation device 5, for example, an electrolyzer that decomposes water into hydrogen and oxygen, a reformer into which a catalyst is inserted, or the like is used. When the hydrogen generation device 5 is an electrolyzer, electricity generated from renewable energy such as solar power generation or wind power generation is used as electricity to be supplied. When the hydrogen generation device 5 is a reformer, hydrocarbon fuel or ammonia is supplied to the reformer, and any one or both of exhaust heat and cooling water heat of the engine are supplied to the reformer.

The hydrogen mixed-combustion electronic control device 12 may supply electricity to the reformer to operate the reformer. A hydrogen storage device (not illustrated) may be provided between the hydrogen generation device 5 and the flow rate adjustment device 6. Here, the hydrogen storage device is, for example, a tank for hydrogen, a hydrogen storing alloy, and an organic hydride. The hydrogen storage device can store hydrogen generated by the hydrogen generation device 5 and extract hydrogen according to a request from the flow rate adjustment device 6. When a hydrogen storing alloy or an organic hydride is used, any one or both of exhaust heat and cooling water heat of the engine are supplied.

The engine control controller 11 controls the injection timing of the first fuel of the injector 4 based on the signals of a crank angle sensor 7 and a cam sensor 8 that detect the rotation timing of the engine. The injection timing of the first fuel is controlled based on the number of revolutions of the engine, the torque, and the signal of an oxygen concentration sensor 10 in the exhaust gas. Since the second fuel partially contains hydrogen, the pre-mixed gas of the second fuel and air achieves dual combustion even at an air ratio larger than the stoichiometric ratio, i.e. under high excess air ratio conditions. Accordingly, dual combustion is established by adding the second fuel to intake air of a known diesel combustion engine.

The hydrogen mixed-combustion electronic control device 12 is a device that controls a mixed ratio of hydrogen mixedly combusted in the combustion room (combustion room 2) of the hydrogen mixed-combustion engine (engine 18) including the first fuel supply device and the second fuel supply device described above. The hydrogen mixed-combustion electronic control device 12 detects the combustion timing of the engine based on the detection results of the crank angle sensor 7 and the cam sensor 8. Based on the detected combustion timing of the engine 18, the hydrogen mixed-combustion electronic control device 12 controls the flow rate adjustment device 6 and the hydrogen generation device 5 to control the flow rate of hydrogen supplied to the engine 18.

An energy management system 13 includes a power generation system together with the hydrogen mixed-combustion electronic control device 12 and a plurality of hydrogen mixed-combustion engines. The energy management system 13 is provided separately from the engine system 20, and manages overall energy including renewable energy and fuel energy used in the engine system 20. For example, the energy management system 13 manages the whole of the renewable energy generated by a solar power generation system or the like and the fuel energy of the engine system 20 controlled by the hydrogen mixed-combustion electronic control device 12.

Thus, one energy management system 13 can manage energy of a plurality of engine systems 20. For example, the engine control controller 11 and the hydrogen mixed-combustion electronic control device 12 are provided in a factory, and the energy management system 13 is provided in the same factory or on a cloud. Accordingly, the energy management system 13 can also manage the energy of the engine control controller 11 and the hydrogen mixed-combustion electronic control device 12 which are disposed at positions separated from each other.

The hydrogen mixed-combustion electronic control device 12 has a function of communicating information with the energy management system 13 including renewable energy, and controls the flow rate adjustment device 6 and the hydrogen generation device 5 based on the energy demand-supply balance of the energy management system 13.

The state of the engine system detected by the hydrogen mixed-combustion electronic control device 12 and the content of the executed control are communicated to the energy management system 13, as a result of which the hydrogen generation plan in the energy management system 13 can be developed. The hydrogen mixed-combustion electronic control device 12 may be mounted inside the engine control controller 11. Temperature detection devices 14 and 15 detect the intake air temperature and the water temperature during engine operation. Further, the temperature detection device 14 may have a function of detecting the intake air humidity.

Figure 2:
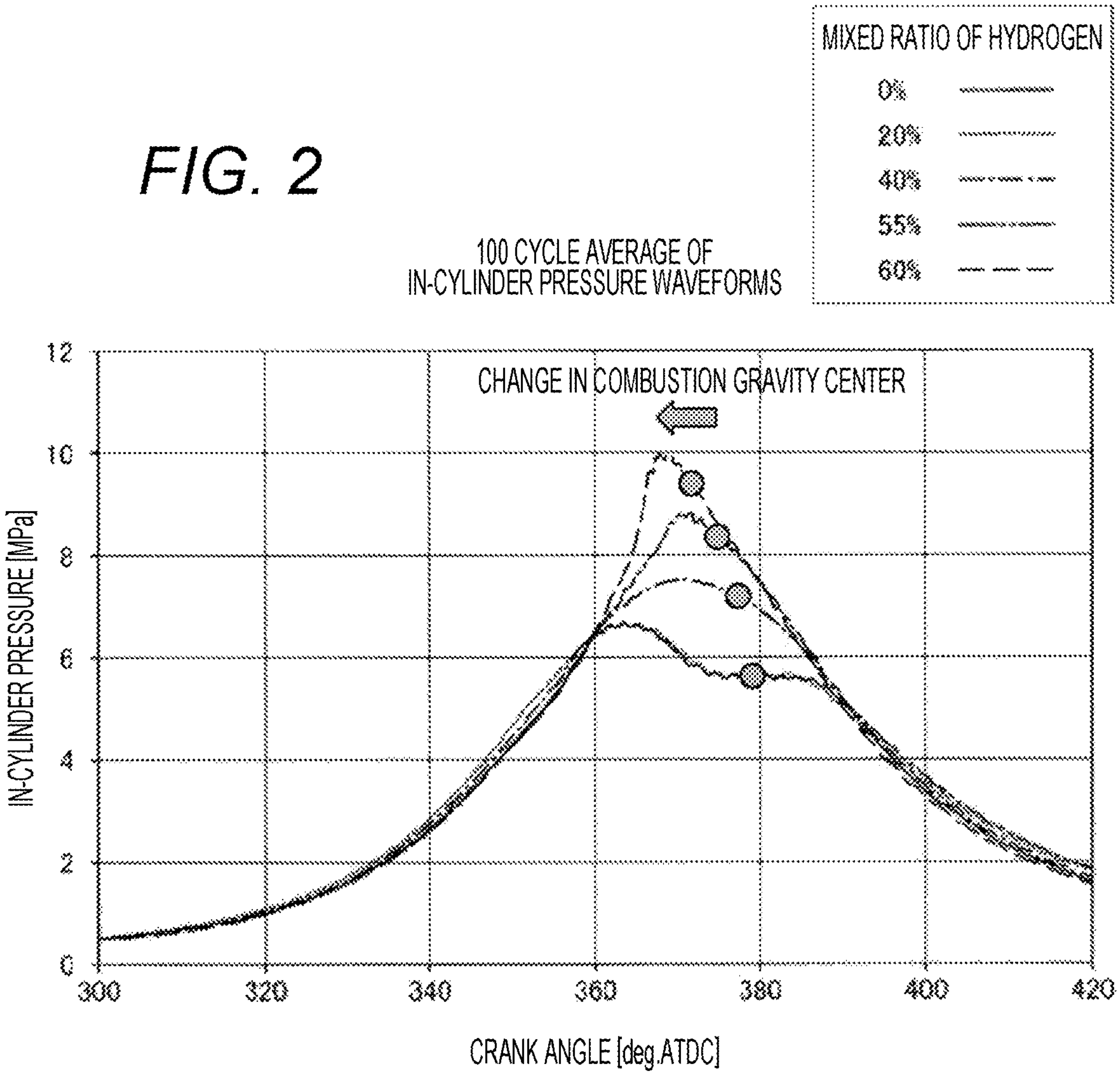
FIG. 2 is a diagram illustrating a 100 cycle average of combustion pressure waveforms of the engine.

FIG. 2 is a diagram illustrating a 100 cycle average of combustion pressure waveforms of the engine. In FIG. 2, the horizontal axis represents a crank angle [deg. ATDC], and the vertical axis represents an in-cylinder pressure [MPa]. The mixed ratio of hydrogen, i.e. a ratio of hydrogen in the total fuel supplied to the engine 18, is changed to 0%, 20%, 40%, 55%, and 60%, and the 100 cycle average of the measured combustion pressures is shown as a combustion pressure waveform.

As illustrated in FIG. 2, it can be seen that as the mixed ratio of hydrogen increases, the combustion pressure rises at an earlier timing, the maximum pressure increases, and the combustion gravity center timing (plot points in the figure) is accelerated. The combustion gravity center timing is defined as a time point when the amount of heat produced by combustion reaches 50% of the calorific value of the supplied fuel. When a mixed ratio of hydrogen of 55% is compared with a mixed ratio of hydrogen of 60%, although the mixed ratio of hydrogen is increased by 5%, there is a large difference in the increase in the maximum pressure and the combustion gravity center timing. As a result, it can be seen that the combustion pressure waveforms are greatly different. This is because a cycle in which abnormal combustion occurs is included when the mixed ratio of hydrogen is 60%.

Figure 3:
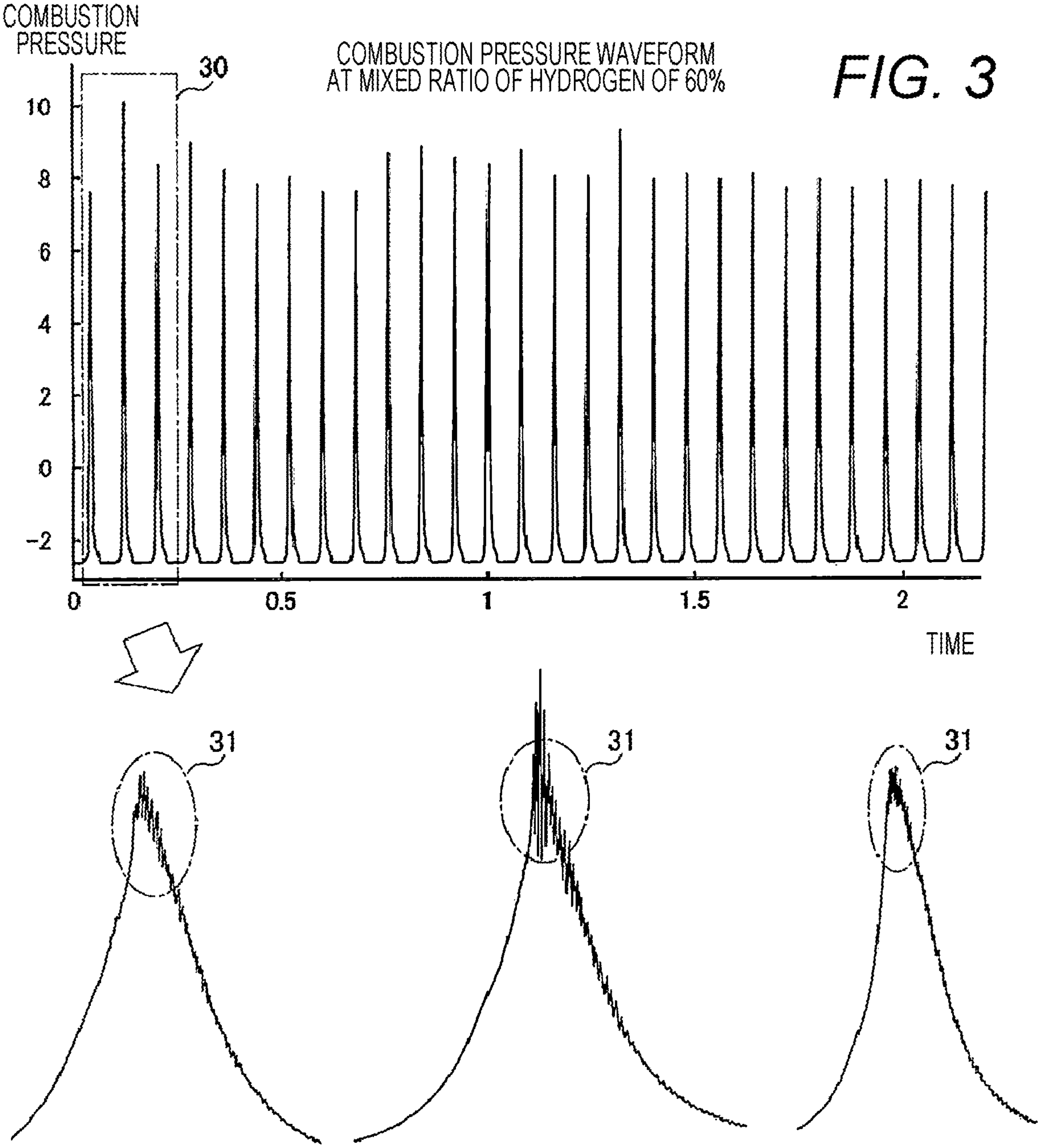
FIG. 3 is a diagram illustrating an example of the combustion pressure waveform for each cycle.

FIG. 3 is a diagram illustrating an example of the combustion pressure waveform for each cycle. In FIG. 3, the horizontal axis represents time, and the vertical axis represents combustion pressure. The upper part of FIG. 3 illustrates an example of the combustion pressure waveform for each cycle at a mixed ratio of hydrogen of 60%. The lower part of FIG. 3 illustrates an enlarged view of the combustion pressure waveform included in a rectangular frame 30 at the left end of the combustion pressure waveform in FIG. 3. As illustrated in FIG. 3, when the mixed ratio of hydrogen becomes 60%, the number of cycles in which abnormal combustion occurs increases.

A top portion 31 of the combustion pressure waveform illustrated in the lower part of FIG. 3 shows a characteristic of the combustion pressure waveform at the time of knocking in which the mixed ratio of hydrogen is a predetermined value or more at which abnormal combustion is likely to occur. When the ratio of hydrogen is equal to or larger than a predetermined value, the probability that such combustion occurs increases. Further, the higher the temperature of the air supplied to the engine and the temperature of the cooling water of the engine are, the higher the probability of knocking occurring. Another example of the abnormal combustion is pre-ignition in which combustion occurs at a timing earlier than a predetermined timing due to heated-surface ignition that occurs when the engine comes into contact with a member having a high temperature in the combustion room of the engine. Similarly to knocking, pre-ignition is likely to occur under conditions where the ratio of hydrogen, the intake air temperature, and the cooling water temperature are high.

When such abnormal combustion occurs in the engine 18, the combustion gravity center timing cannot be controlled within a normal timing range, and thus thermal efficiency deteriorates. Additionally, an increase in the rise timing of the pressure in the combustion room 2 or occurrence of radio frequency of pressure pulsation can cause failure of the engine. Thus, in order to prevent failure of the engine, it is necessary to perform adjustment control such as reduction of the amount of hydrogen supplied.

As described above, abnormal combustion occurs under an environmental condition such as a change in outside air temperature, or at the time of transient change of the engine. Thus, the engine control controller 11 and the hydrogen mixed-combustion electronic control device 12 need to detect combustion of the engine 18 in real time and grasp the combustion state.

As another problem, when the amount of the second fuel supplied is small and the mixed ratio of hydrogen is low, part of the second fuel containing the supplied hydrogen may be discharged as it is without being combusted in the combustion room. For example, in FIG. 2, when a mixed ratio of hydrogen of 0% is compared with a mixed ratio of hydrogen of 20%, there is almost no change in the waveform. Under such conditions, since the second fuel containing hydrogen does not contribute to combustion, the thermal efficiency of the engine decreases. Further, since unburned hydrogen is discharged to the outside of the engine, there is a concern about a safety problem.

As described above, a case in which hydrogen is discharged in an unburned state under the condition of a low mixed ratio of hydrogen is likely to occur. Hydrogen is a component that is easily combusted under an excessive air condition as compared with a hydrocarbon fuel. However, when an excess air ratio of an air-fuel mixture of sucked hydrogen and sucked air is 8 to 10 or more, the condition is outside the combustible range. With respect to the combustibility at a low mixed ratio of hydrogen, the mixed ratio of hydrogen serving as a threshold at which unburned hydrogen is discharged changes depending on the outside air temperature and the cooling water temperature. Further, since the supercharging pressure and the temperature of the intake air also change depending on the operating condition of the engine 18, such as the number of revolutions of the engine 18 and torque, the mixed ratio of hydrogen serving as the threshold also changes depending on the operating condition of the engine 18.

Thus, it is necessary to detect the combustion state in real time and grasp the combustibility of hydrogen supplied to the combustion room 2.

Here, it is conceivable to detect the combustion state by mounting an in-cylinder pressure sensor for each cylinder and grasping the in-cylinder pressure history at the time of combustion, but there are problems of additional cost for mounting and installation space. Therefore, in the hydrogen mixed-combustion electronic control device according to the present embodiment, the crank angle sensor 7 as a rotation sensor of the crank shaft 17 is used to detect the combustion state from a change in the rotation time of the crank shaft 17.

Figure 4:
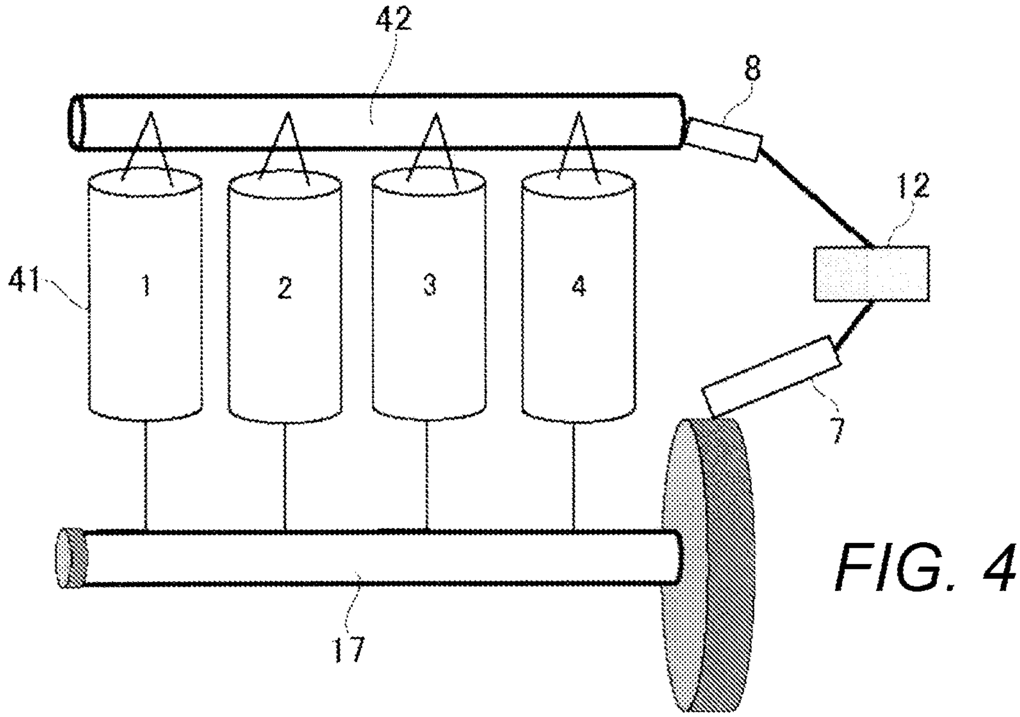
FIG. 4 is a diagram illustrating an arrangement example of cylinders, a crank shaft, a camshaft, and a controller.

FIG. 4 is a diagram illustrating an arrangement example of cylinders 41, a crank shaft 17, a camshaft 42, and a controller. The four cylinders 41 illustrated in the figure are denoted by numerical values "1" to "4". The crank angle sensor 7 is used to detect the combustion state from a change in the rotation time of the crank shaft 17. The cam sensor 8 connected to the camshaft 42 is used to grasp the reference of the rotational position.

Figure 5:
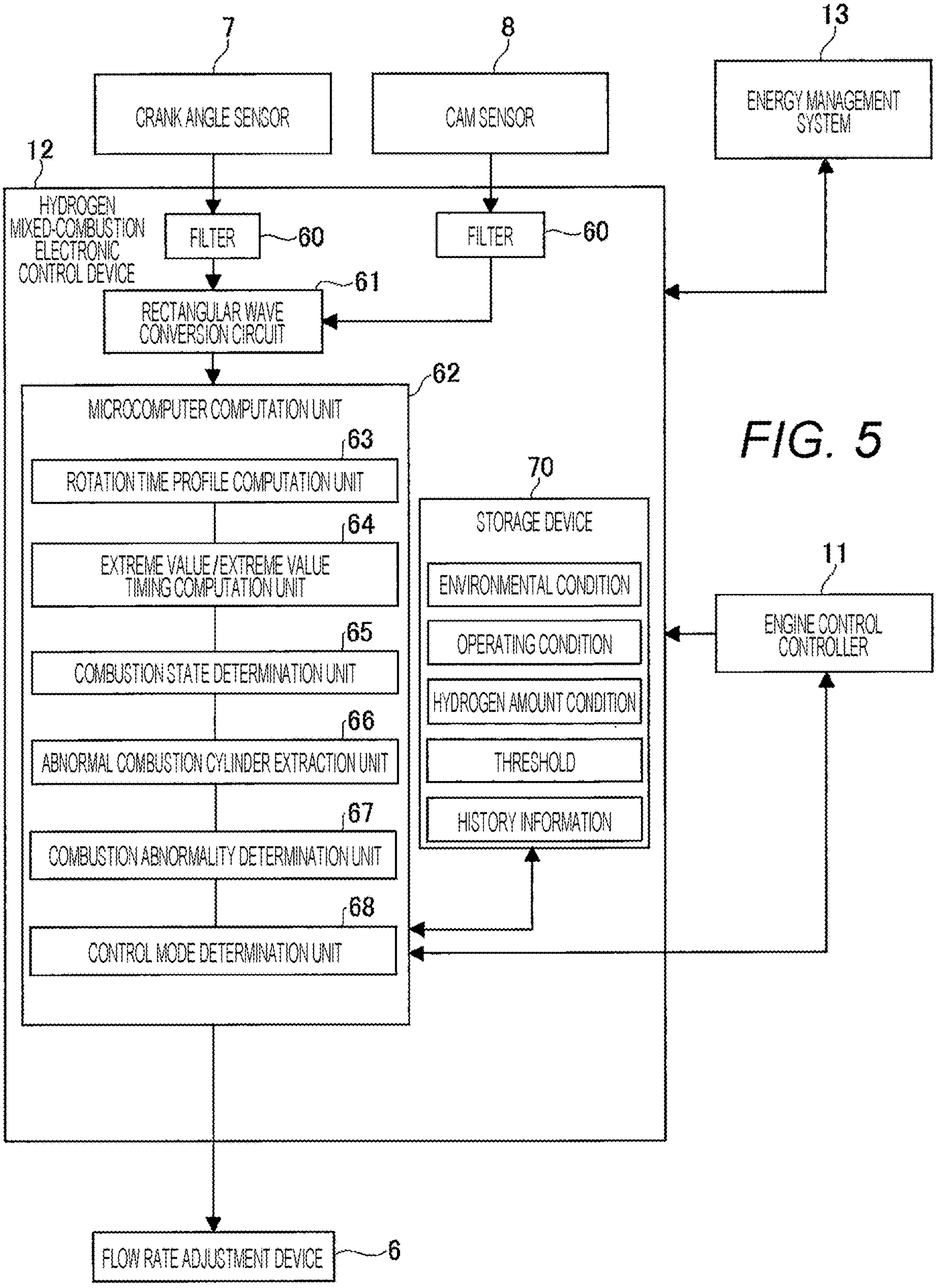
FIG. 5 is a block diagram illustrating an internal configuration example of a hydrogen mixed-combustion electronic control device 12.

The hydrogen mixed-combustion electronic control device according to the present embodiment will be described with reference to FIGS. 5, 6, and 7. FIG. 5 is a block diagram illustrating an internal configuration example of the hydrogen mixed-combustion electronic control device 12. The hydrogen mixed-combustion electronic control device 12 includes a filter 60, a rectangular wave conversion circuit 61, a microcomputer computation unit 62, and a storage device 70.

FIG. 6 is a diagram illustrating an example of a signal of an electromagnetic pickup in a system using the electromagnetic pickup. The vertical axis represents a voltage [V], and the horizontal axis represents time. As illustrated in FIG. 6, in the method using the electromagnetic pickup, the voltage is output at a cycle proportional to the rotation speed of the detection gear of the rotation shaft, and the output signal is input to the rectangular wave conversion circuit 61. The rectangular wave conversion circuit 61 generates a rectangular wave that switches between ON and OFF of the rectangular wave at a point crossing 0 V of the electromagnetic pickup, and outputs the rectangular wave to the microcomputer computation unit 62. When a Hall element is used, the output signal is taken into the microcomputer computation unit 62. The filter 60 may be used to remove gear characteristics and noise in both the electromagnetic pickup and the Hall element.

For example, a low-pass filter is used as the filter 60, and the cutoff frequency is set to 10 KHz or more. Alternatively, a moving average filter or the like may be used.

The microcomputer computation unit 62 includes a rotation time profile computation unit 63, an extreme value/extreme value timing computation unit 64, a combustion state determination unit 65, an abnormal combustion cylinder extraction unit 66, a combustion abnormality determination unit 67, and a control mode determination unit 68.

The rotation time profile computation unit 63 detects, for each edge, a physical quantity corresponding to the rotation time between the edges using a falling edge of the rectangular wave as a trigger, and acquires a rotation time profile, i.e. a profile of the time change. Note that a rising edge may be used as a trigger.

FIG. 7 is a diagram illustrating an example of a rotation time profile in the case of a four-cylinder engine. The vertical axis represents an angular velocity, and the horizontal axis represents a crank angle. As illustrated in FIG. 7, in the case of the four-cylinder engine, the extreme value of the angular velocity is detected four times at minimum and four times at maximum during two revolutions of the crank shaft. The extreme value/extreme value timing computation unit 64 computes the extreme value timing (Ha) of the rotation time and the extreme value (Hb) of the rotation time from the rotation time profile output from the rotation time profile computation unit 63. At this time, signal processing is performed using Fourier series expansion, and thus it possible to ignore the individual difference of the detection gear of the rotation shaft of the electromagnetic pickup. Here, the extreme value may be either the maximum value or the minimum value, but in the present embodiment, the extreme value (Hb) is defined as the maximum value of the rotation time.

Figures 9, 10:
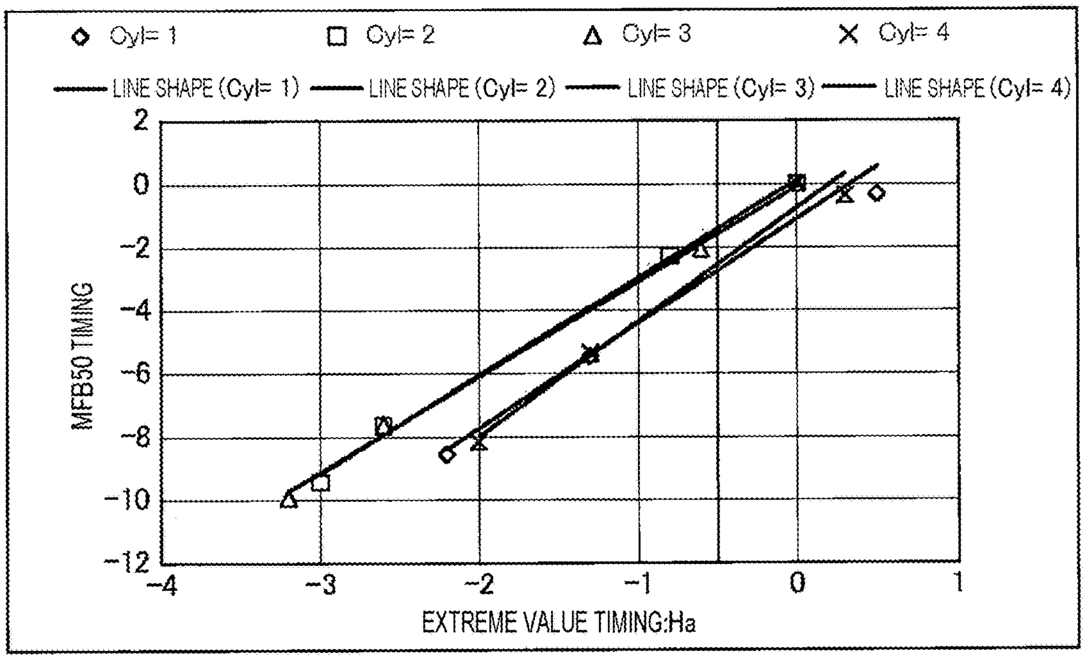
FIG. 9 is a flowchart illustrating combustion abnormality determination using an extreme value of rotation time and an extreme value timing.
FIG. 10 is a diagram illustrating a correlation between extreme value timing and combustion gravity center.

The combustion state determination unit 65 determines the combustion state based on the extreme value timing (Ha) and the extreme value (Hb). FIG. 10 is a a diagram illustrating a correlation between the extreme value timing (Ha) and the combustion gravity center timing (MFB 50 timing). As illustrated in FIG. 10, the extreme value timing (Ha) shows a correlation with the combustion gravity center timing (MFB 50 timing). In general, when the mixed ratio of hydrogen increases, the MFB 50 timing is advanced, and thus the extreme value timing (Ha) is also advanced, that is, being a small value. In a case where the extreme value timing (Ha) does not change even though the mixed ratio of hydrogen is increased, the combustion state determination unit 65 determines that there is a misfire because the combustion gravity center is not advanced by hydrogen supply.

Meanwhile, when the mixed ratio of hydrogen is increased to a predetermined value or more, the extreme value timing (Ha) becomes small (advanced). At that time, an event occurs in which the extreme value (Hb) becomes larger than a predetermined value or the variation in the extreme value timing (Ha) becomes larger than a predetermined value. This event will be described with reference to FIGS. 11A and 11B.

Figure 11A:
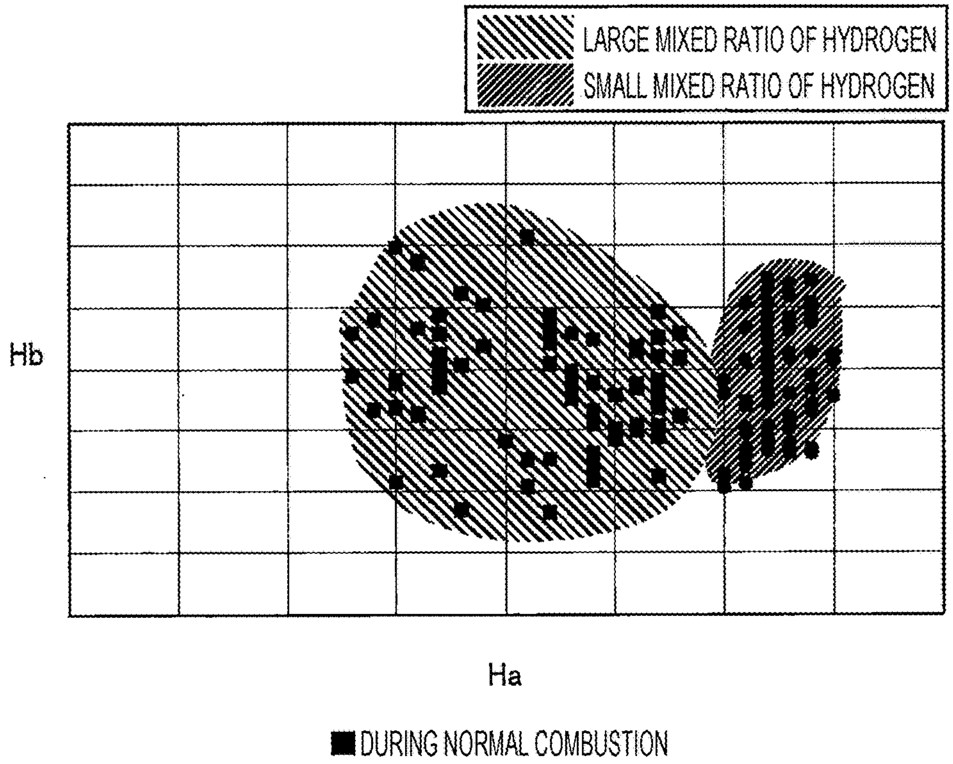
FIG. 11A is a diagram showing plot points for each cycle during normal combustion.
Figure 11B:
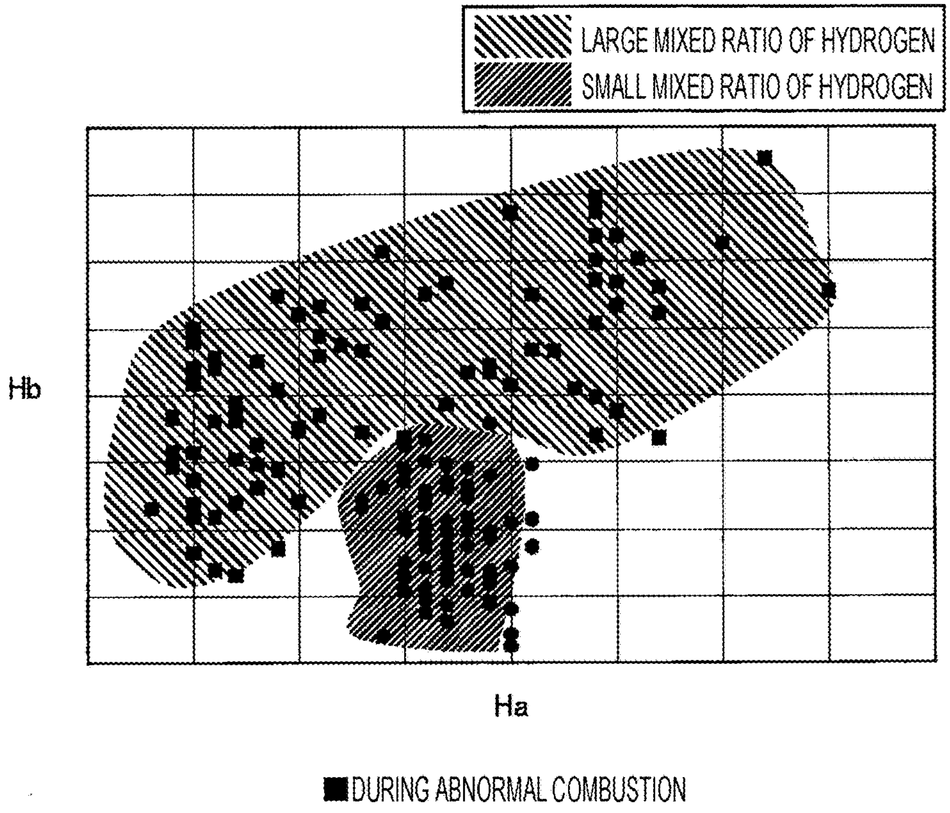
FIG. 11B is a diagram showing plot points for each cycle during abnormal combustion.

FIG. 11A is a diagram showing plot points for each cycle during normal combustion. FIG. 11B is a diagram showing plot points for each cycle during abnormal combustion. In each of the figures, the vertical axis represents the extreme value (Hb), and the horizontal axis represents the extreme value timing (Ha).

As shown in FIG. 11A, in normal combustion, when the mixed ratio of hydrogen is increased, the extreme value timing (Ha) decreases. Meanwhile, as shown in FIG. 11B, the extreme value (Hb) during abnormal combustion becomes larger than a predetermined value (e.g. when the mixed ratio of hydrogen is small). The variation range of the extreme value timing (Ha) during abnormal combustion becomes larger than a predetermined value (e.g. the variation range of the extreme value timing (Ha) during normal combustion). In such a case, the combustion state determination unit 65 determines that pre-ignition or knocking has occurred.

The combustion abnormality determination unit 67 determines a threshold of an average value (AHb) of the predetermined number of cycles of the extreme value (Hb) and a threshold of the variation of the predetermined number of cycles of the extreme value timing (Ha) based on the information of the combustion abnormality determination value, the environmental condition, the operating condition, and the like, for each cylinder stored in the storage device 70, and determines the combustion abnormality using the information.

Here, the predetermined number of cycles is one or more cycles, and the number of cycles is determined in accordance with operation characteristics. For example, the number of cycles is set to 10 cycles or more in the operation under steady conditions, and is set to 10 cycles or less in the operation under transient conditions. Here, as the variation, for example, a threshold is determined using any index of a standard deviation, a variance, or a coefficient of variation. The threshold of the average value and the threshold of the variation may be set for each cylinder. Setting the thresholds for each cylinder makes it possible to accurately detect abnormal combustion. In the present embodiment, the variation will be described using a coefficient of variation (Cv).

Figure 15:
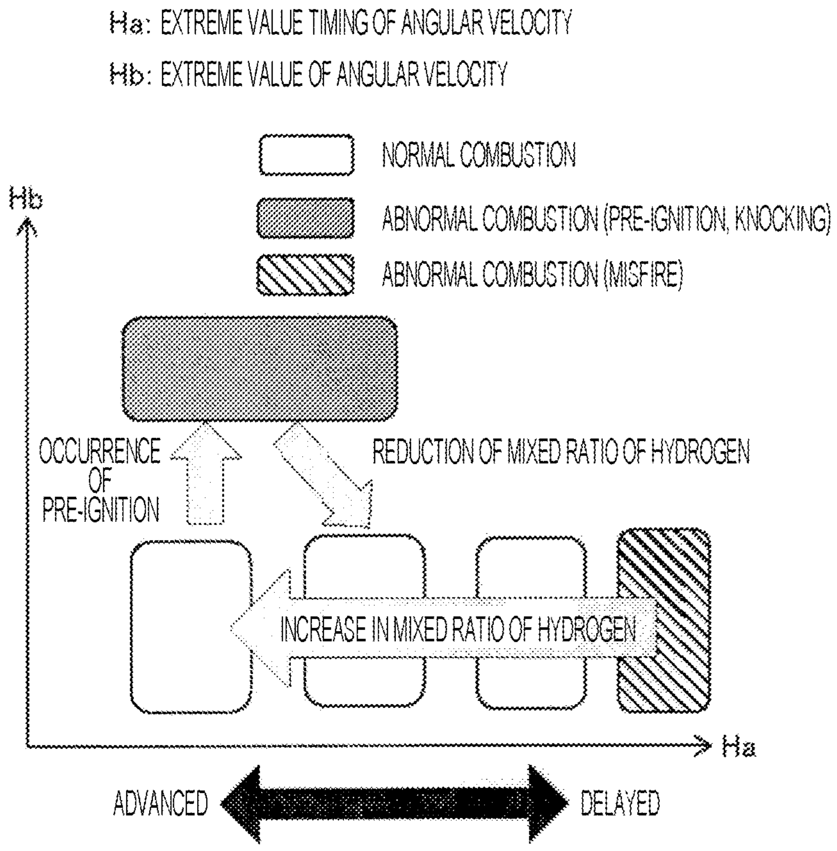
FIG. 15 is a diagram illustrating a relationship between an extreme value (Hb) and an extreme value timing (Ha) in a predetermined cylinder.

FIG. 15 is a diagram illustrating a relationship between an extreme value (Hb) and extreme value timing (Ha) in a predetermined cylinder. The extreme value timing (Ha) changes as the combustion gravity center timing (MFB 50 timing) changes according to the mixed ratio of hydrogen in the fuel supplied to the engine. Specifically, as the mixed ratio of hydrogen increases, the value of the extreme value timing (Ha) decreases. That is, the extreme value timing is advanced. When abnormal combustion, such as pre-ignition or knocking, occurs under a condition of a high mixed ratio of hydrogen, the extreme value (Hb) increases, and the average value AHb of the extreme values in a predetermined cycle becomes larger than a threshold LHb. Further, the variation (Cv) of the extreme value timing increases and becomes equal to or larger than a threshold LCv.

Therefore, the combustion abnormality determination unit 67 performs the following determination when the average value (AHa) in the predetermined cycle of the extreme value timing (Ha) satisfies a condition of, for example, being smaller than a predetermined value.

FIG. 9 is a flowchart illustrating combustion abnormality determination using an extreme value of rotation time and an extreme value timing.

In the case of AHb<LHb and Cv<LCv, abnormal combustion does not occur. Therefore, the combustion abnormality determination unit 67 determines that the normal combustion has occurred. In the case of AHb>LHb and Cv<LCv, the combustion abnormality determination unit 67 determines that abnormal combustion such as pre-ignition or knocking has frequently occurred (Abnormality A). In this case, the combustion torque becomes higher than a predetermined value, and the AHb becomes larger than the LHb. Since the combustion gravity center is stably generated at an early timing, Cv<LCv is satisfied. In the case of AHb<LHb, and Cv>LCv, the combustion abnormality determination unit 67 determines that knocking or misfire has occurred since the combustion torque does not become larger than the predetermined value but the combustion gravity center varies (Abnormality C). In the case of AHb>LHb and Cv>LCv, the combustion torque becomes larger than the predetermined value and the combustion gravity center varies. Thus, the combustion abnormality determination unit 67 determines that abnormal combustion such as pre-ignition or knocking has occurred although not every cycle (Abnormality B).

The abnormal combustion cylinder extraction unit 66 discriminates a cylinder in which abnormal combustion has occurred based on the detection results of the crank angle sensor 7 and the cam sensor 8. The reference position of rotation is grasped by the cam sensor 8, and thus the extreme value timing (Ha) and the extreme value (Hb) for each cylinder are extracted.

When the crank angle sensor 7 detects the rotation time, the change in the rotation speed receives torque interference for each cylinder. In the case of an engine generator, the engine control controller 11 controls the number of revolutions of the engine 18 to be within a predetermined range. Thus, in a case where a certain cylinder causes combustion abnormality and the rotation speed of the crank shaft 17 changes, the engine control controller 11 performs control such that another cylinder is in a direction opposite to the direction of change in the rotation speed. Therefore, when abnormal combustion occurs in any cylinder, there is a cylinder affected by the cylinder with abnormal combustion among the cylinders with normal combustion. Since the control cycle of the engine is 2 to 10 ms, the cylinder with normal combustion is affected by the cylinder with abnormal combustion within the control cycle.

Figure 12:
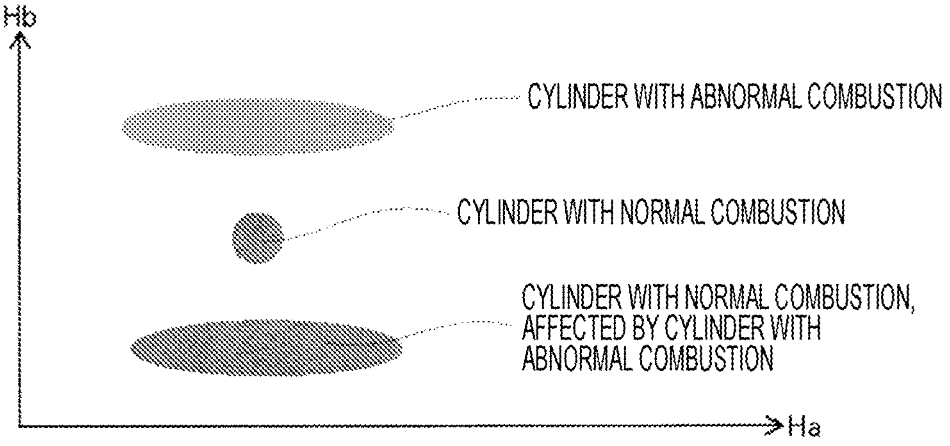
FIG. 12 is a diagram illustrating a relationship between an extreme value timing (Ha) and an extreme value (Hb) in each cylinder.

A method for specifying a cylinder at the time of occurrence of an abnormality will be described with reference to FIG. 12. FIG. 12 is a diagram illustrating a relationship between the extreme value timing (Ha) and the extreme value (Hb) in each cylinder. As illustrated in FIG. 12, in the cylinder with abnormal combustion, the extreme value (Hb) increases, and the variation (Cv) in the extreme value timing increases. The cylinder with normal combustion affected by the cylinder with abnormal combustion is controlled to be in a direction opposite to the direction of change in the rotation speed, and thus the extreme value (Hb) decreases and the variation (Cv) in the extreme value timing increases. Therefore, confirming the extreme value timing (Ha) and the extreme value (Hb) of each cylinder makes it possible to identify the cylinder in which abnormal combustion has occurred.

In a case where pre-ignition or knocking has occurred in a predetermined cylinder, the occurrence of abnormal combustion can be suppressed by reducing the amount of hydrogen supplied. As shown in FIG. 15, in general, when the mixed ratio of hydrogen is increased, the value of the extreme value timing (Ha) decreases. In a case where abnormal combustion has occurred, the value of the extreme value (Hb) increases and the variation (Cv) in the extreme value timing increases. Thus, abnormal combustion can be detected. In a case where abnormal combustion has been detected, decreasing the mixed ratio of hydrogen makes it possible to determine an optimal mixed ratio of hydrogen under the operating condition.

The amount of hydrogen supplied may be adjusted for each cylinder. Adjusting the amount of hydrogen supplied for each cylinder makes it possible to increase the amount of hydrogen supplied. Thus, the amount of carbon dioxide emissions can be further reduced. Regarding a method of adding the amount of hydrogen for each cylinder, for example, the amount of hydrogen to be supplied for each cylinder can be adjusted by controlling the drive pulse width of the hydrogen injector attached for each cylinder. Further, the amount of a known fuel supplied may be adjusted for each cylinder by adjusting the injection pulse width of the known fuel to be supplied for each cylinder.

Note that, in the present embodiment, the method of confirming the extreme value timing (Ha) and the extreme value (Hb) of each cylinder has been described, but it is also possible to discriminate a cylinder in which abnormal combustion has occurred from the characteristics of the output signal of the crank angle sensor 7 and the rotation time profile after the signal processing.

Figure 13:
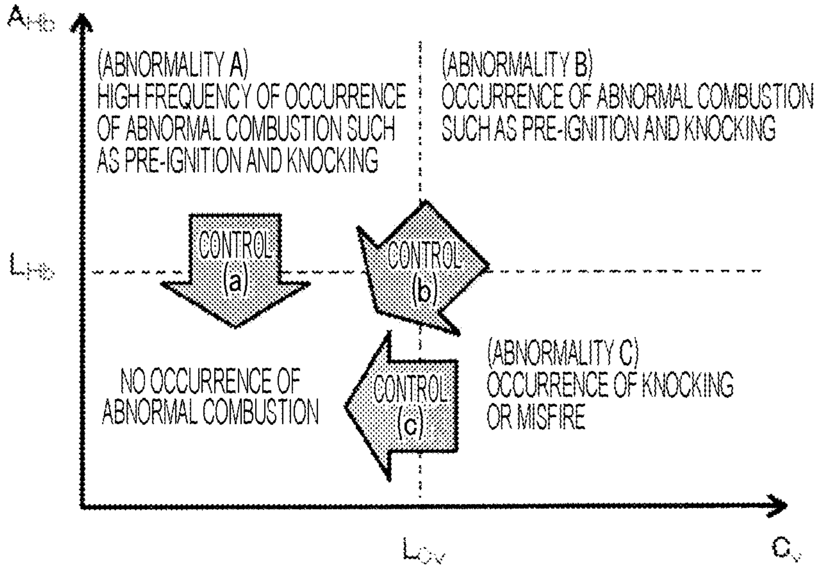
FIG. 13 is a diagram illustrating a relationship between variations in extreme value timing and an average value of extreme values in a predetermined cycle.

The control mode determination unit 68 determines a control mode of the engine 18 based on the extraction result of the abnormal combustion cylinder extraction unit 66. FIG. 13 is a diagram illustrating a relationship between the variation (Cv) in the extreme value timing and the average value (AHb) of the extreme values in a predetermined cycle.

Control (a) is control performed when Abnormality A occurs. The frequency of occurrence of abnormal combustion such as pre-ignition or knocking is high, and thus the supply of hydrogen is immediately stopped and the combustion is switched to combustion using only the known fuel.

Control (b) is control performed when Abnormality B occurs. Because of a situation in which abnormal combustion such as pre-ignition or knocking has occurred although not every cycle, the amount of hydrogen supplied is reduced and the control to reduce the mixed ratio of hydrogen is performed. Thus, it is possible to eliminate the occurrence of abnormal combustion.

Control (c) is control performed when Abnormality C occurs. The mixed ratio of hydrogen is finely adjusted while referring to the value of the variation (Cv) in the extreme value timing, and the adjusted value is used to determine whether the abnormality is caused by misfire or knocking. In a case where an increase in the mixed ratio of hydrogen results in a decrease in the Cv, the case is determined to be caused by misfire. Conversely, in a case where an increase in the mixed ratio of hydrogen results in an increase in the Cv, it is determined that knocking has occurred.

The control mode determination unit 68 stores, in the storage device 70, the relationship between the operating condition such as the number of revolutions and torque of the engine and the mixed ratio of hydrogen before and after each control.

In the microcomputer computation unit 62 of the hydrogen mixed-combustion electronic control device 12, information acquired in advance or information acquired in real time is used by accessing to the storage device 70, and thus computation accuracy can be enhanced.

Specifically, the type of occurrence of abnormal combustion (Abnormalities A, B, and C in FIG. 13), the operating condition at the occurrence of abnormal combustion (the number of revolutions and torque of the engine, and the mixed ratio of hydrogen), and the environmental condition (the intake air temperature and the water temperature) are stored in the storage device 70 as operation records. Further, the storage device 70 stores various thresholds. As the threshold to be stored, for example, the threshold LCv of the variation in the extreme value timing and the threshold LHb of the average value AHb of the extreme values are stored for each operating condition and environmental condition.

In addition, a threshold of a suppliable amount hydrogen condition acquired from the energy management system 13 may be stored. The hydrogen amount condition is determined by the energy management system 13 in accordance with the generation plan of the hydrogen generation device. Specifically, a power generation amount of renewable energy such as solar power generation is large and a large amount of hydrogen can be generated in a time zone in which surplus power is generated, the threshold of the hydrogen amount condition is large. These thresholds can be updated or accumulated in a cycle of 1 s or more.

In addition, when calculating the AHb and the Cv, a predetermined cycle is acquired, and the predetermined number of cycles is stored in the storage device 70 to calculate the average value and the variation. In this case, to store data in real time when the engine is operated, the stored data is updated within a cycle of 10 ms.

Figure 8:
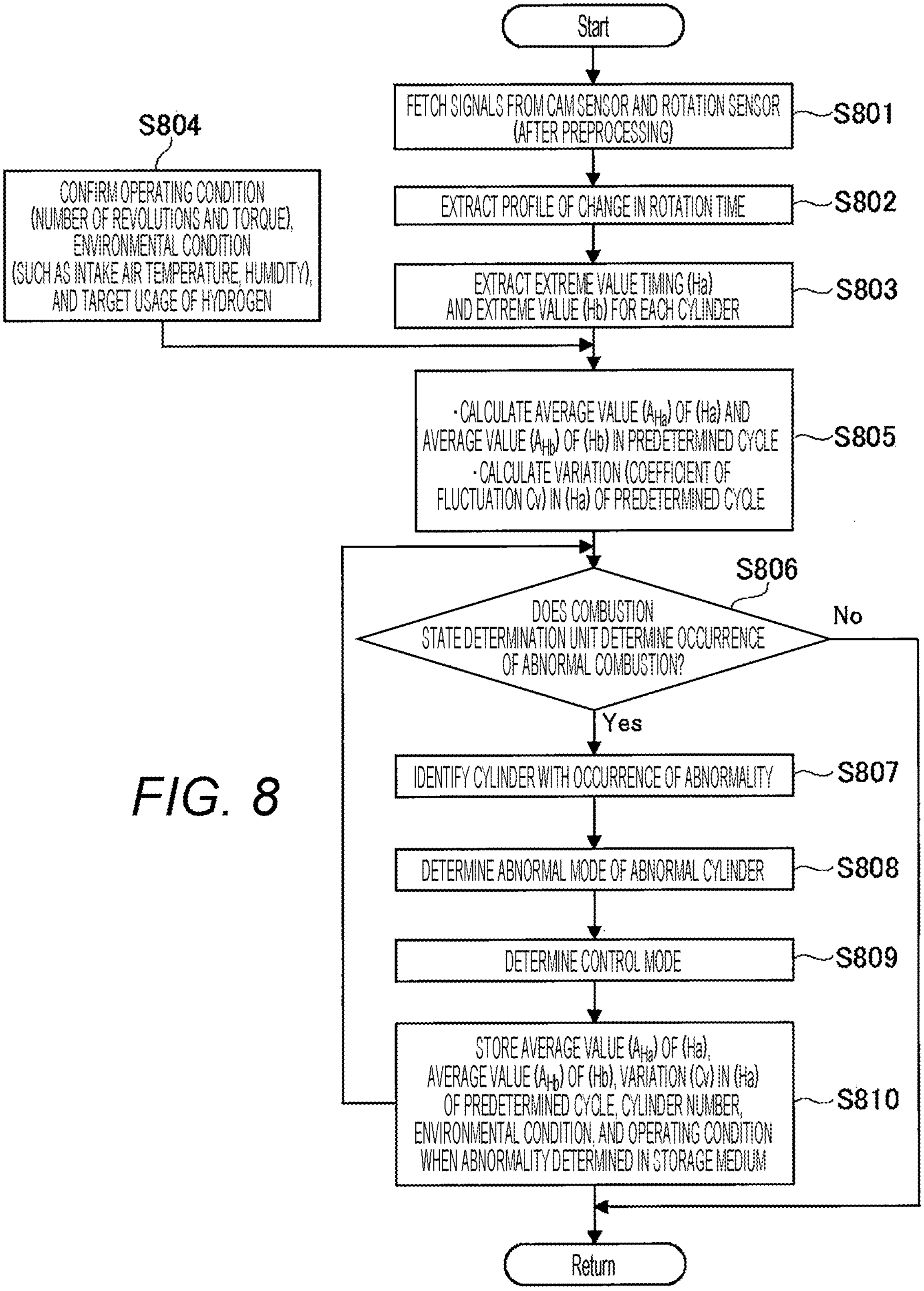
FIG. 8 is a diagram showing a control flow of the hydrogen mixed-combustion electronic control device.

FIG. 8 is a diagram showing a control flow of the hydrogen mixed-combustion electronic control device 12. The hydrogen mixed-combustion electronic control device 12 performs the determination processing shown in FIG. 8, and controls the flow rate adjustment device 6 that supplies fuel to the engine 18 based on the result.

First, signals from the cam sensor 8 and the crank angle sensor (rotation sensor) 7 are fetched (S801). The signal of the crank angle sensor 7 is a signal converted into a rectangular wave of 5 V, and a profile of change in time (rotation time) between edges is acquired for each edge (S802). Next, the extreme value timing (Ha) and the extreme value (Hb) of the rotation time for each cylinder are extracted from the profile of the change in rotation time (S803).

When the cylinder discrimination is performed from the profile of the change in rotation time, the cam sensor 8 serving as a timing reference is utilized. Here, when the signal of the cam sensor 8 cannot be acquired, the cylinder discrimination may be performed from the extreme value under a predetermined operating condition. For example, the average value (AHb) is different for each cylinder in the operation when hydrogen is not supplied under a stable combustion condition, thus it is also possible to perform the cylinder discrimination by comparing the initial value of the AHb with the acquired AHb.

Next, the average value (AHb) of the extreme values of the predetermined cycle and the variation (Cv) in the extreme value timing are calculated (S805). The predetermined cycle is selected within a range of 1 cycle or more and 200 cycles or less, and is selected according to the operating condition and the environmental condition acquired in S804.

For example, when the steady operation is the main operation, a value of 10 cycles or more is selected as the predetermined cycle. Whereas when the transient change is large, a value of 10 cycles or less is selected as the value of the predetermined cycle. In the case of the transient operation, it is necessary to reduce the number of cycles in order to acquire the operation of the engine under the same condition. Then, the acquired data and operating condition are accumulated in the storage device 70 as a set, and the determination is performed by combining the acquired data and operating condition with the past data of the same operating condition.

Meanwhile, a value of 10 cycles or more is selected during steady operation, and the number of cycles is increased in accordance with the degree of influence on the analysis accuracy. For example, when the analysis accuracy is low, the number of cycles is increased to 100 to 200. Conversely, when the analysis accuracy is high, the analysis is performed in 10 to 50 cycles. This makes it possible to improve the analysis accuracy while shortening the time until an abnormality is detected.

The smaller the number of acquisition cycles, the more the determination can be made in real time. Accordingly, it is possible to cope with sudden abnormal combustion. Further, the lower the number of cycles, the smaller the amount of data to be acquired in the storage device 70. Meanwhile, when the accuracy of analysis is low, the higher the number of acquisition cycles, the higher the accuracy can be improved. For example, the above accuracy changes due to a change in the fuel property, a change in the state of engine components, and the like, and thus the variation (any one of a variance, a standard deviation, and a coefficient of fluctuation is used as an index) in the analysis result may increase even though the operating condition and the environmental condition of the engine are the same. Therefore, in such a case, the analysis accuracy can be enhanced by increasing the number of acquisition cycles.

The presence or absence of abnormal combustion is confirmed based on the results of the AHa and the AHb, which are the average value of the extreme value timing (Ha) and the average value of the extreme value (Hb) calculated in S805, respectively, and the variation (Cv) in the extreme value timing (S806). Next, when any combustion abnormality among misfire, pre-ignition, and knocking is detected in a cylinder, the cylinder in which the abnormality has occurred is identified (S807), and then the abnormality mode of the abnormal cylinder is determined (S808). Further, the control mode is determined based on the identification result of the cylinder in which abnormal combustion has occurred (S809).

Figure 14A:
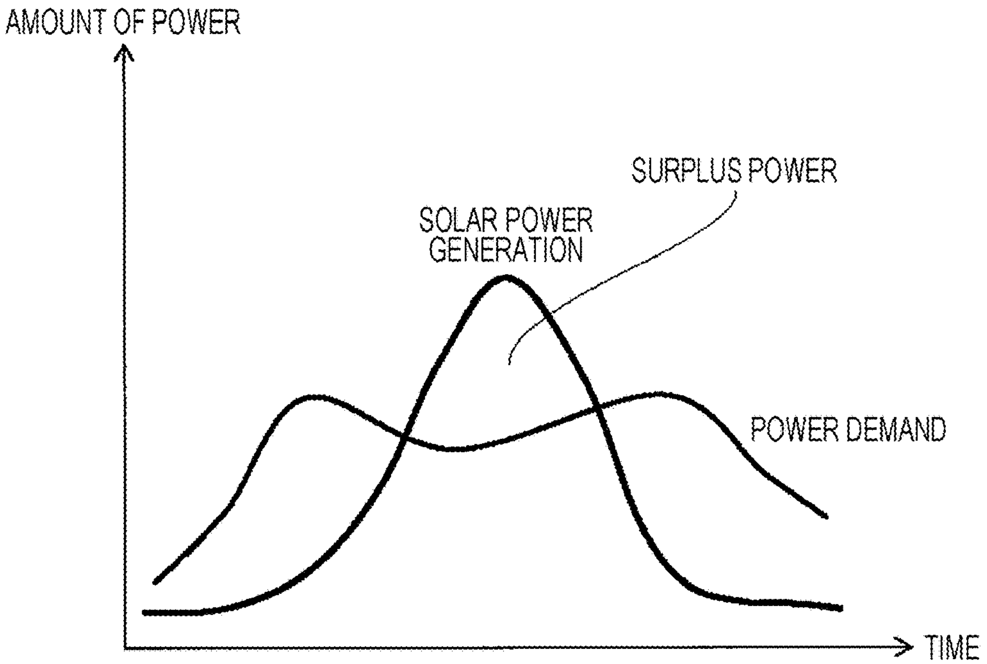
FIG. 14A is a diagram illustrating an example of transition of solar power generation amount and transition of power demand when surplus power is generated.
Figure 14B:
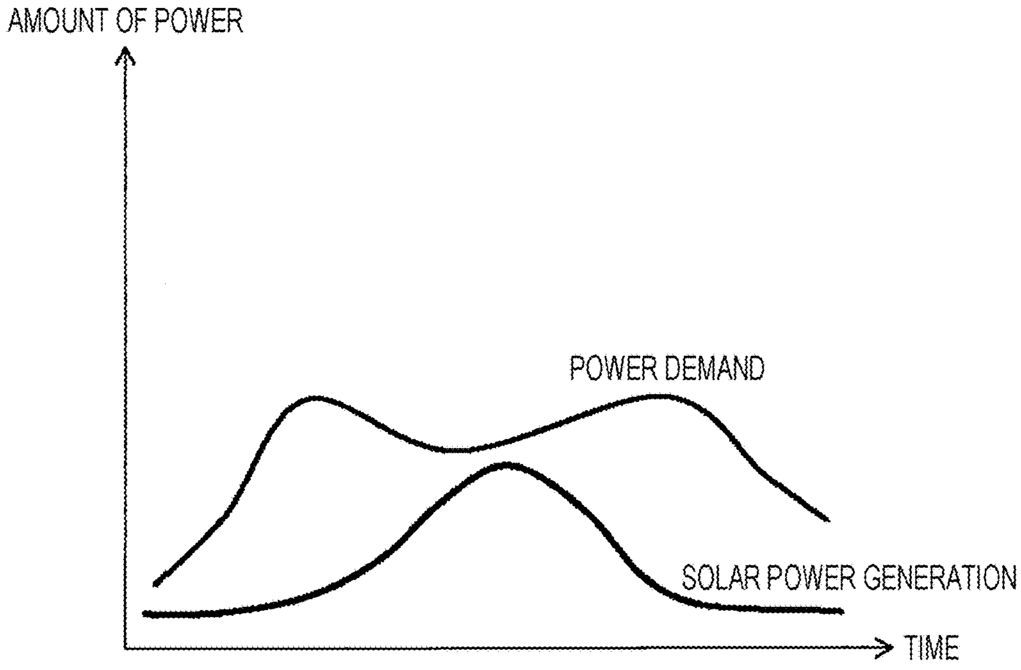
FIG. 14B is a diagram illustrating an example of transition of solar power generation amount and transition of power demand when no surplus power is generated.

The hydrogen amount condition is determined by the energy management system 13 in accordance with the generation plan of the hydrogen generation device. Hydrogen can generate a large amount of renewable energy, and the amount of hydrogen generated increases when the surplus power is large. FIG. 14A is a diagram illustrating an example of transition of solar power generation amount and transition of power demand when surplus power is generated. FIG. 14B is a diagram illustrating an example of transition of solar power generation amount and transition of power demand when no surplus power is generated.

As illustrated in FIG. 14A, when a time zone in which the solar power generation amount exceeds the amount of power demand occurs due to the weather prediction and the power demand prediction, surplus power can be used for generation of hydrogen. Meanwhile, as illustrated in FIG. 14B, in a case where the weather is predicted to be rainy or cloudy by the weather prediction, and the solar power generation falls below the power demand, the power available for the generation of hydrogen is reduced.

As described above, in a case where the time zone or the scale in which the surplus power is generated increases based on the weather prediction or the power demand prediction, the amount of hydrogen generated is planned to be large. Consequently, the amount of hydrogen that can be supplied to the present system increases, and the threshold of the hydrogen amount condition increases.

The energy management system 13 has data of hydrogen supply amount prediction on a daily basis, a weekly basis, or a monthly basis, and can determine the amount of hydrogen that can be supplied to the engine 18 based on the prediction data. Therefore, the energy management system 13 can be configured to create a hydrogen supply plan that is a plan of an amount of hydrogen to be supplied to the hydrogen mixed-combustion electronic control device 12 based on the environmental condition, and the hydrogen mixed-combustion electronic control device 12 can be configured to determine a mixed ratio of hydrogen in the engine 18 based on the hydrogen supply plan.

When the engine system 20 includes a plurality of engines 18, the hydrogen mixed-combustion electronic control device may have a function of allocating the amount of hydrogen that can be supplied to each of the engines 18 to the amount of hydrogen that can be supplied by the energy management system 13. Thus, an optimal amount of hydrogen can be allocated to each of the engines 18 in accordance with the state of each of the engines 18, and the amount of hydrogen supplied can be appropriately controlled in accordance with the characteristics of the engines 18 and the environmental change. Accordingly, the amount of hydrogen supplied can be controlled within a range in which abnormal combustion does not occur, and the amount of hydrogen supplied can be appropriately controlled in accordance with the characteristics of the engines and the environmental change. Further, maximizing the amount of hydrogen supplied makes it possible to maximize a reduction amount of CO2 discharged from the engines 18.

Finally, the extreme value timing (Ha) corresponding to the combustion abnormal state (misfire, pre-ignition, or knocking), the threshold of the extreme value (Hb), and the cylinder in which the combustion abnormality has occurred, the variation (Cv) in the extreme value timing (Ha) of the predetermined cycle, the environmental condition in which each of the engines 18 is installed, the operating condition (e.g. the water temperature of the engine, the intake air temperature, the intake air humidity, the fuel injection timing, the ignition timing, etc.), and the like are stored in the storage device 70 as history information (S810). Utilizing the information stored in the storage device 70 makes it possible to perform highly accurate abnormality determination corresponding to an external environment such as outside air temperature and humidity and the secular change of the engine.

Note that the present invention is not limited to the above-described embodiments, and it is obvious that various other application examples and modified examples can be taken without departing from the gist of the present invention described in the claims.

For example, the above-described embodiments describe the configuration of the system in detail and specifically in order to describe the present invention in an easy-to-understand manner, and are not necessarily limited to those having all the described configurations. Besides, a part of the configuration of the present embodiment can be added to the configuration of another embodiment, can be deleted, and can be replaced with the configuration of another embodiment. In addition, the control lines and the information lines indicate what is considered to be necessary for the description, and do not necessarily indicate all the control lines and the information lines on the product. In practice, it may be considered that almost all the configurations are connected to each other.

REFERENCE SIGNS LIST

1 piston
2 combustion room
4 injector
5 hydrogen generation device
6 flow rate adjustment device
7 crank angle sensor
8 cam sensor
11 engine control controller
12 hydrogen mixed-combustion electronic control device
13 energy management system
17 crank shaft
18 engine
20 engine system
41 cylinder
60 filter
61 rectangular wave conversion circuit
62 microcomputer computation unit
63 rotation time profile computation unit
64 extreme value/extreme value timing computation unit
65 combustion state determination unit
66 abnormal combustion cylinder extraction unit

67 combustion abnormality determination unit

68 control mode determination unit

70 storage device

The invention claimed is:

1. A hydrogen mixed-combustion electronic control device that controls a mixed ratio of hydrogen mixedly combusted in a combustion room of a hydrogen mixed-combustion engine, the hydrogen mixed-combustion engine including a first fuel supply device configured to supply a first fuel to an engine, and a second fuel supply device configured to supply, as a second fuel, fuel partially containing hydrogen to the engine, the hydrogen mixed-combustion electronic control device comprising:

a crank angle sensor that detects a rotation time of a crank shaft of the engine; and a computation unit that computes an extreme value of the rotation time of the crank shaft and an extreme value timing based on a detection result of the crank angle sensor, wherein the hydrogen mixed-combustion electronic control device determines a combustion state of the engine based on the extreme value and the extreme value timing.

2. The hydrogen mixed-combustion electronic control device according to claim 1, which adjusts a mixed ratio of hydrogen in the second fuel based on the extreme value timing and the extreme value.

3. The hydrogen mixed-combustion electronic control device according to claim 1, which determines either one or both of abnormal combustion and misfire of the engine based on the extreme value timing and the extreme value.

4. The hydrogen mixed-combustion electronic control device according to claim 1, wherein when an average value of the extreme values of a predetermined number of cycles exceeds a first predetermined value and a variation in the extreme value timing of the predetermined number of cycles is equal to or less than a second predetermined value, the hydrogen mixed-combustion electronic control device determines occurrence of abnormal combustion, and sets a ratio of hydrogen supplied to the engine to zero.

5. The hydrogen mixed-combustion electronic control device according to claim 1, wherein when an average value of the extreme values of a predetermined number of cycles exceeds a first predetermined value and a variation in the extreme value timing of the predetermined number of cycles exceeds a second predetermined value, the hydrogen mixed-combustion electronic control device determines occurrence of abnormal combustion, and reduces an amount of hydrogen supplied to the engine.

6. The hydrogen mixed-combustion electronic control device according to claim 1, wherein when an average value of the extreme values of a predetermined number of cycles is equal to or less than a first predetermined value and a variation in the extreme value timing of the predetermined number of cycles is higher than a second predetermined value, in a case where an increase in the mixed ratio of hydrogen results in a decrease in the variation in the extreme value timing, the case is determined to be caused by misfire, and in a case where a decrease in the mixed ratio of hydrogen results in an increase in the variation in the extreme value timing, the case is determined to be caused by abnormal combustion.

7. The hydrogen mixed-combustion electronic control device according to claim 4, wherein the first predetermined value and the second predetermined value are set based on one or more of history information of the engine, an operating condition of the engine, or an environmental condition in which the engine is installed.

8. The hydrogen mixed-combustion electronic control device according to claim 4, wherein the predetermined number of cycles is set based on at least one of history information of the engine, an operating condition of the engine, or an environmental condition in which the engine is installed.

9. The hydrogen mixed-combustion electronic control device according to claim 1, wherein the engine includes a plurality of cylinders, and a cylinder with abnormal combustion is extracted based on the extreme value timing and the extreme value for each of the cylinders.

10. The hydrogen mixed-combustion electronic control device according to claim 9, which changes a mixed ratio of the hydrogen in a cylinder determined as abnormal combustion among the plurality of cylinders.

11. The hydrogen mixed-combustion electronic control device according to claim 1, wherein when a combustion state of the engine is determined, at least one of a cylinder in which combustion abnormality occurs, a water temperature of the engine, an intake air temperature, an intake air humidity, a fuel injection timing, and an ignition timing is stored as history information in a storage device.

12. A power generation system comprising:

the hydrogen mixed-combustion electronic control device described in claim 11;

a plurality of hydrogen mixed-combustion engines; and an energy management system configured to provide information to the hydrogen mixed-combustion electronic control device, wherein the hydrogen mixed-combustion electronic control device determines an amount of hydrogen supplied to each of the plurality of hydrogen mixed-combustion engines based on at least one of an environmental condition in which the engine is installed, an amount of hydrogen that can be supplied to the power generation system, or the history information.

13. A power generation system comprising:

the hydrogen mixed-combustion electronic control device described in claim 11;

a plurality of hydrogen mixed-combustion engines; and an energy management system configured to provide information to the hydrogen mixed-combustion electronic control device, wherein the energy management system creates a hydrogen supply plan that is a plan of an amount of hydrogen to be supplied to the hydrogen mixed-combustion electronic control device based on an environmental condition in which the engine is installed, and the hydrogen mixed-combustion electronic control device determines a mixed ratio of the hydrogen of the plurality of hydrogen mixed-combustion engines based on the hydrogen supply plan.

* * * * *